US008628145B2

(12) United States Patent
Parida et al.

(10) Patent No.: US 8,628,145 B2
(45) Date of Patent: Jan. 14, 2014

(54) VEHICLE SEAT BUCKLE

(75) Inventors: Satish Parida, Farmington Hills, MI (US); Kenneth C. Farkas, Dearborn Heights, MI (US); Allen W. Holmes, Westland, MI (US); Joseph B. a. Rajkumar, Ypsilanti, MI (US); Jeffrey P. Medvecky, Brighton, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/125,378

(22) PCT Filed: Oct. 21, 2009

(86) PCT No.: PCT/US2009/061482
§ 371 (c)(1),
(2), (4) Date: Jul. 12, 2011

(87) PCT Pub. No.: WO2010/048286
PCT Pub. Date: Apr. 29, 2010

(65) Prior Publication Data
US 2011/0254332 A1    Oct. 20, 2011

Related U.S. Application Data

(60) Provisional application No. 61/107,517, filed on Oct. 22, 2008.

(51) Int. Cl.
*B60R 22/00* (2006.01)
(52) U.S. Cl.
USPC .......................... 297/481; 297/468; 297/378.1

(58) Field of Classification Search
USPC .......... 297/378.1, 481, 468, 378.12, 340, 316; 280/801.1, 801.2
See application file for complete search history.

(56) References Cited

U.S. PATENT DOCUMENTS

| 4,133,556 A | | 1/1979 | Glinski | |
|---|---|---|---|---|
| 4,229,041 A | * | 10/1980 | Werner | 297/468 |
| 4,676,555 A | * | 6/1987 | Tokugawa | 297/473 |

(Continued)

FOREIGN PATENT DOCUMENTS

| DE | WO 2004/033252 A1 | | 4/2004 |
|---|---|---|---|
| JP | 2005178701 A | * | 7/2005 |
| WO | PCT/US2009/061482 | | 1/2010 |

OTHER PUBLICATIONS

English language translation abstract of JP 02-095953, date of publication: Jun. 4, 1990, Title: Seat Belt Device.

(Continued)

*Primary Examiner* — Peter Brown
*Assistant Examiner* — Alexander Harrison
(74) *Attorney, Agent, or Firm* — Butzel Long

(57) ABSTRACT

A seat buckle apparatus for use in a vehicle seat assembly having a seat back, a seat base, and a base portion, the seat buckle apparatus comprising a bracket member having a first end and a second end, the bracket member for coupling to the vehicle seat; a first belt buckle portion for being movably supported to the vehicle seat and having an upper end, a lower end, and an engagement member for engaging the bracket member; and wherein the bracket member will prevent the upper end of the belt buckle from contacting the seat back when the seat back is folded down on the seat base.

13 Claims, 16 Drawing Sheets

(56) References Cited

U.S. PATENT DOCUMENTS

| | | | |
|---|---|---|---|
| 4,763,924 A * | 8/1988 | Karlin et al. | 280/806 |
| 5,332,261 A | 7/1994 | Siepierski | |
| 5,374,110 A * | 12/1994 | Hiramatsu | 297/480 |
| 5,597,206 A * | 1/1997 | Ainsworth et al. | 297/378.12 |
| 5,607,185 A | 3/1997 | Isaji et al. | |
| 6,149,242 A * | 11/2000 | Pesta et al. | 297/480 |
| 6,224,130 B1 * | 5/2001 | Sasaki et al. | 296/65.13 |
| 6,357,795 B1 * | 3/2002 | Krauss et al. | 280/801.1 |
| 7,040,704 B2 * | 5/2006 | Epaud | 297/378.1 |
| 7,857,350 B2 * | 12/2010 | Yamada et al. | 280/801.1 |
| 8,439,448 B2 * | 5/2013 | Murthy | 297/481 |
| 8,459,748 B2 * | 6/2013 | Jovicevic | 297/481 |
| 2003/0227213 A1 * | 12/2003 | Yamaguchi et al. | 297/468 |
| 2005/0248199 A1 * | 11/2005 | Epaud | 297/378.1 |
| 2009/0001795 A1 * | 1/2009 | Homier et al. | 297/341 |

OTHER PUBLICATIONS

Form PCT/ISA/210, International Search Report, dated Dec. 21, 2009, mailing date: Jan. 21, 2010.

Form PCT/IB/373 International Preliminary Report on Patentability, dated Apr. 26, 2011.

* cited by examiner

SECTION A-A

SECTION A-A

US 8,628,145 B2

VEHICLE SEAT BUCKLE

CROSS-REFERENCE TO RELATED APPLICATIONS

The present application is a U.S. National Stage filing of International Application No, PCT/US2009/061482, filed Oct. 21, 2009, titled "VEHICLE SEAT BUCKLE," which claims priority to U.S. Provisional Patent Application No. 61/107,517, filed Oct. 22, 2008, the entire disclosures of which are incorporated herein by reference.

BACKGROUND

The present disclosure relates generally to the field of vehicle seating. More specifically, this disclosure relates to vehicle seat having an improved seat belt buckle system.

Current vehicle seat buckles create marks, such as wrinkles, on seat trim covers when the vehicle seat is placed in a stow flat position, particularly where the seat back is folded on top of the seat cushion. These marks or wrinkles are exacerbated when the vehicle seat remains in the stow flat position for extended durations and overtime may lead to premature wear and tear (i.e., damage) of the trim cover.

There remains a continuing need to provide an improved seat belt buckle design that does not create marks, such as wrinkles, on seat trim covers when the vehicle seat is placed in the stow flat position.

SUMMARY

A seat buckle apparatus for use in a vehicle seat assembly having a seat back, a seat base, and a base portion, the seat buckle apparatus comprising a bracket member having a first end and a second end, the bracket member for coupling to the vehicle seat; a first belt buckle portion for being movably supported to the vehicle seat and having an upper end, a lower end, and an engagement member for engaging the bracket member; and wherein the bracket member will prevent the upper end of the belt buckle from contacting the seat back when the seat back is folded down on the seat base.

A vehicle seat assembly, comprising a seat back pivotably coupled to a seat base; a seat buckle apparatus comprising a bracket member having a first end and a second end, the bracket member for coupling to the vehicle seat; a first belt buckle portion for being movably supported to the vehicle seat and having an upper end, a lower end, and an engagement member for engaging the bracket member; and wherein the bracket member will prevent the upper end of the belt buckle from contacting the seat back when the seat back is folded down on the seat base.

DETAILED DESCRIPTION

Figure 1:
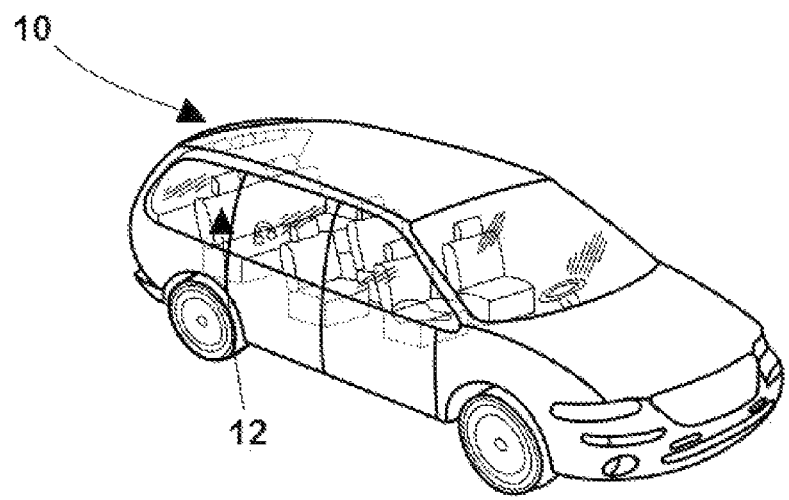
FIG. 1 is a perspective view of a vehicle, according to an exemplary embodiment.
Figure 2:
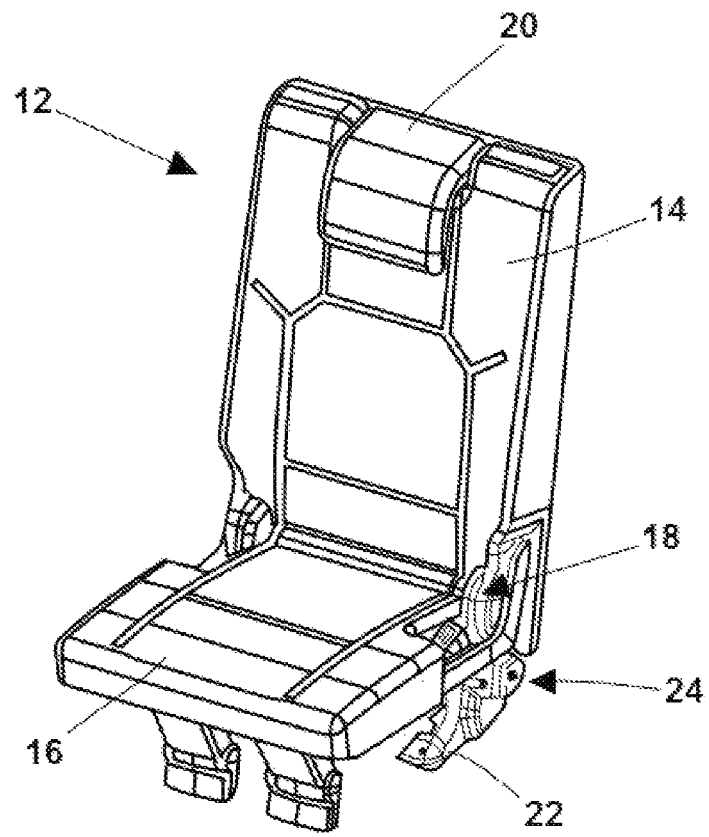
FIG. 2 is a perspective view of a seating assembly according to an exemplary embodiment.

Referring generally to the FIGURES and in particular to FIG. 1, a vehicle 10 is shown according an exemplary embodiment. The vehicle 10 includes one or more vehicle seats 12 provided for an occupant of the vehicle 10. One exemplary embodiment of a vehicle seat structure 12 is shown in FIG. 2. While the vehicle 10 shown is a mini-van, it should be understood that the seat may be used in a 4 door sedan, sport utility vehicle or any other means in or by which someone travels or something is carried or conveyed for any market or application including everything from office seating and transportation to planes and space travel and everything in between. The vehicle seat 12 shown includes a seat back 14, a seat base 16, and a connection member or recliner 18 coupled to the seat back 14 and the seat base 16. The vehicle seat 12 further may include a head restraint 20 and base portion 22. The head restraint 20 extends upward from the seat back 14 and is configured to restrain the head of an occupant during an impact. The base portion 22 (e.g. brackets, track assembly, etc.) couples the seat 12 to the vehicle 10 body and may be configured to allow the seat 12 to be selectively positioned (manually or motor driven) relative to the vehicle 10 body. The vehicle seat assembly may also include a seat belt buckle mechanism 24.

Figure 3:
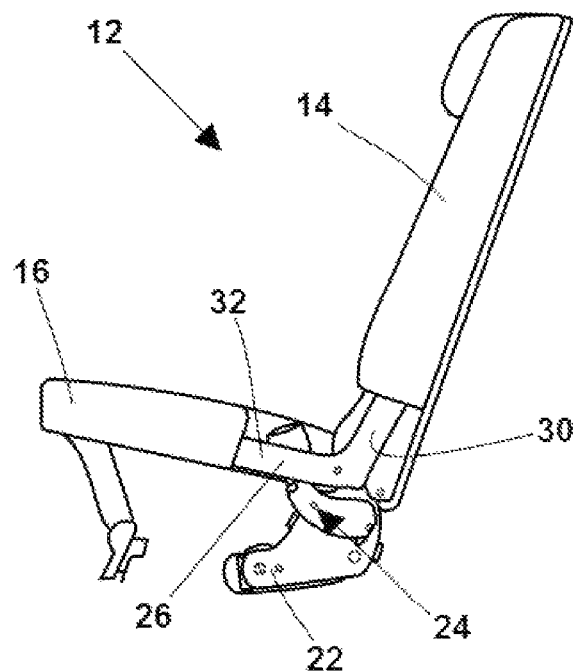
FIG. 3 is a side view of a vehicle seat having a belt buckle in the design position according to an exemplary embodiment.
Figure 4:
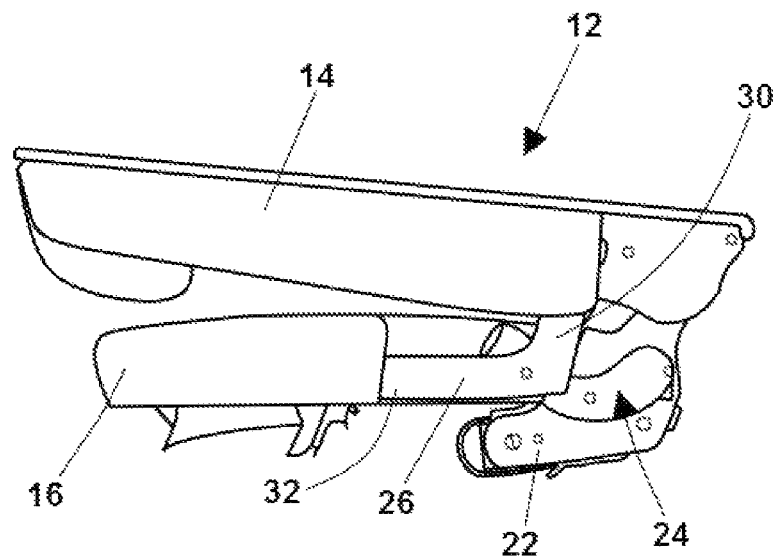
FIG. 4 is a side view of a vehicle seat having a belt buckle in the stow flat position according to an exemplary embodiment.

Referring to FIGS. 3 and 4, a vehicle seat assembly 12 is shown wherein the vehicle seat 12 includes a seat back 14, a seat base or cushion 16, a base portion (or bracket) 22, a link bracket 26, and a belt buckle mechanism 24 according to an exemplary embodiment. The base portion (or bracket) 22 of the vehicle seat 12 may alternatively include a four-bar link mechanism 28 (not shown) that enables selective positioning of the vehicle seat 12 between the design and stow flat positions. In the design (or use) position, the seat base 16 is elevated above and aligned substantially parallel to the vehicle 10 floor (preferably at a predetermined angle for comfort of the passenger) and the seat back 14 is in a reclined position relative to the vertical direction, as shown in FIG. 3. In the stow (or stow flat or clam shell) position, the seat back 14 is folded forward and downward towards the seat base 16 such that the seat back 14 is positioned substantially flat against the seat base 16, as shown in FIG. 4. The link bracket 26 is generally "L" shaped and has a first end 30 and a second end 32. The first end of the link bracket 30 is preferably pivotally coupled to the seat back 14 and the second end 32 is coupled to the seat base 16 (cushion). The vehicle seat 12 preferably includes a link bracket 26 on the inboard and outboard sides of the vehicle seat 12. A belt buckle 24 is coupled to the base portion 22 and is positioned between the link bracket 26 and the seat base 16 (cushion) and is designed to pivot between a first position associated with the design position of the vehicle seat 12 and a second position associated with the stow position of the vehicle seat 12.

Figure 5:
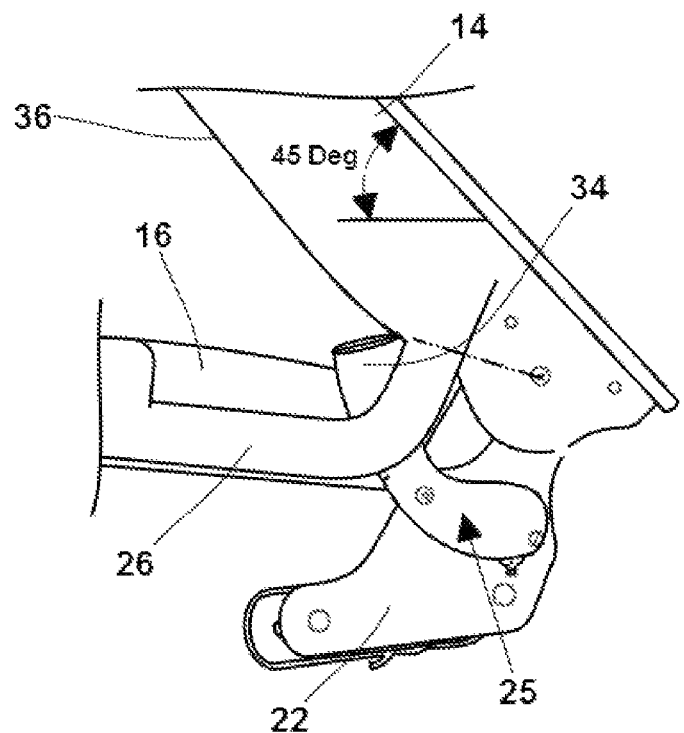
FIG. 5 is a partial side view of vehicle seat having a current belt buckle mechanism in a partially stowed position according to a prior art example.
Figure 6A:
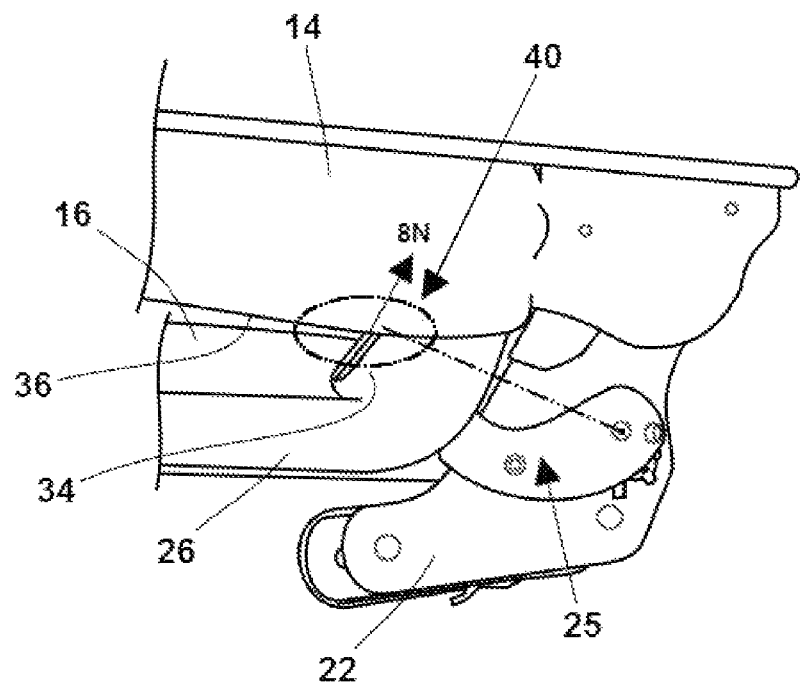
FIG. 6A is a partial side view of a vehicle seat having a current belt buckle mechanism in the stow flat position according to a prior art example.
Figure 6B:
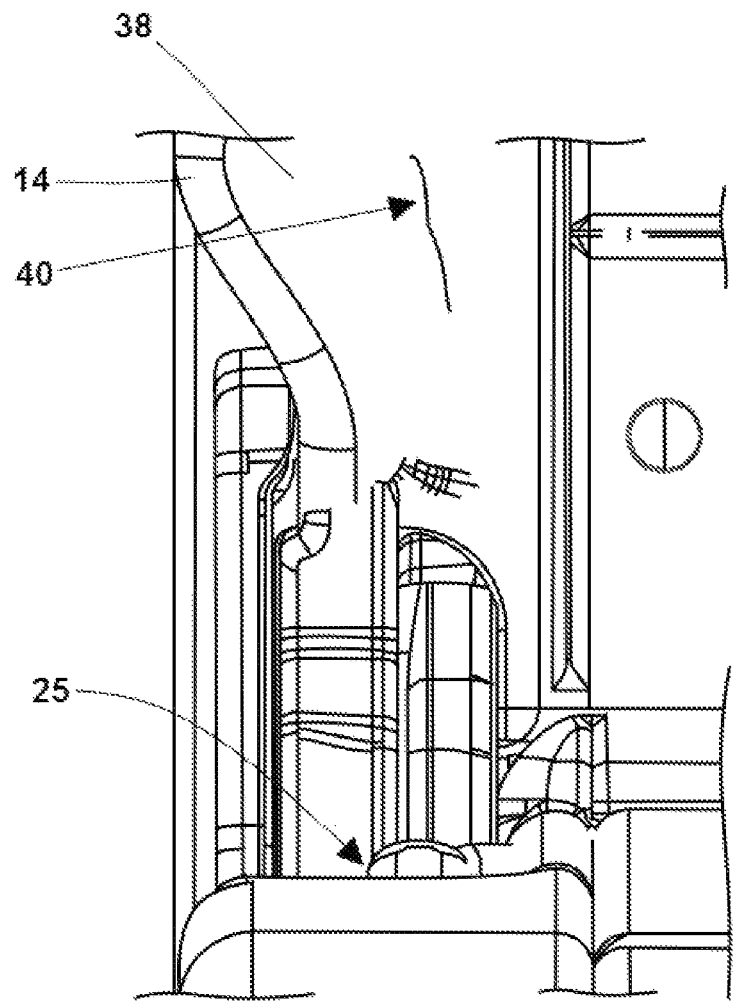
FIG. 6B is an enlarged front view of a vehicle seat having a current belt buckle mechanism and a seat back having a wrinkle/mark according to a prior art example.
Figure 7:
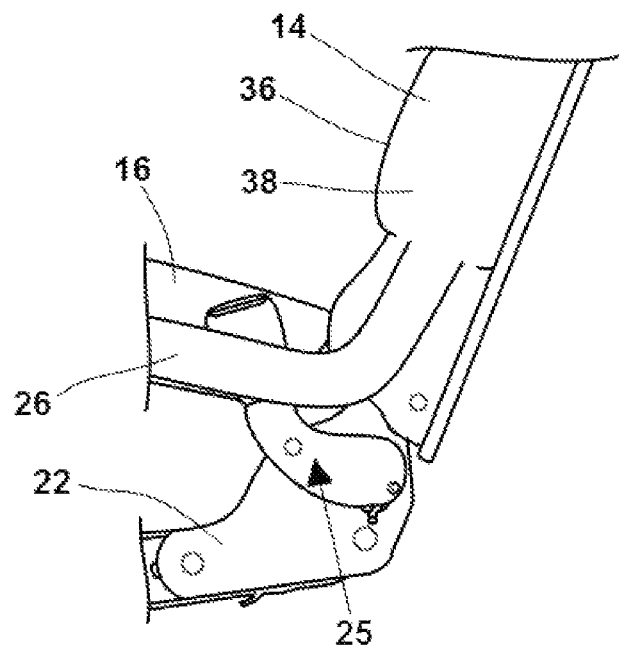
FIG. 7 is a partial side view of a vehicle seat having a current belt buckle mechanism in the design position according to a prior art example.

Referring now to FIGS. 5-7, a seat 12 having a belt buckle 25 is shown in the partially stowed, stowed and design positions according to prior art examples. As shown in FIG. 5, when moving a known vehicle seat 12, the vehicle seat 12 including a belt buckle 25, from the design position to the stow position, the seat back 14 comes into contact with the belt buckle 25. As the known vehicle seat 12 progresses toward the stow position, the upper portion (or end) of the belt buckle 34 contacts and is forced into the seat back 14, as shown in FIG. 6A. A biasing force (e.g., spring force, etc.) acts on the belt buckle 24 to urge the belt buckle 24 toward the first position which forces the upper portion of the belt buckle 34 to be pushed into the front surface of the seat back 36. As the vehicle seat 12 remains in the stow position with the belt buckle 25 forced into the seat back 14 for an extended period of time, such as when cargo is located in the vehicle 10 or even during shipment of the vehicle seat 12, the upper end of the belt buckle 34 can affect the appearance of the surface of the trim cover 38 of the seat back 14 and may even create a visible mark 40 (e.g., wrinkle, crease, etc.) on the trim cover 38, as shown in FIG. 6B.

Figure 8:
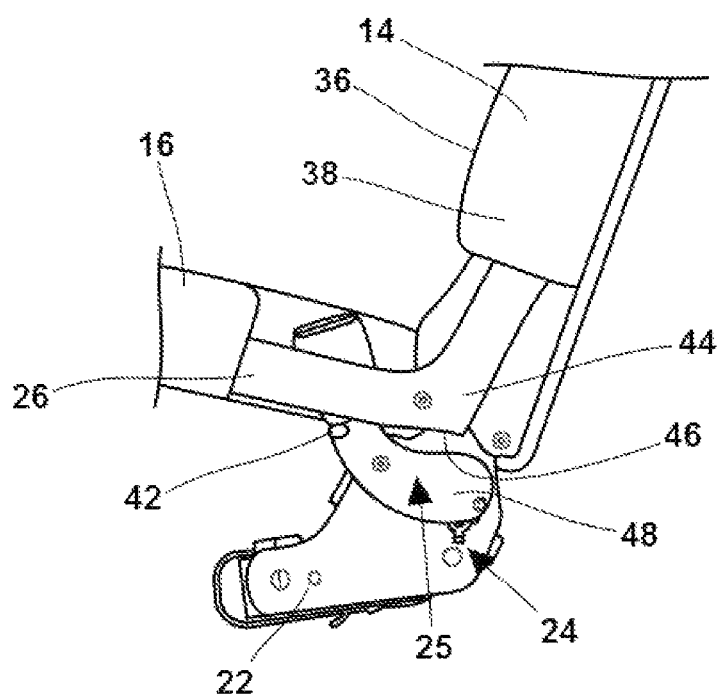
FIG. 8 is a partial side view of a vehicle seat having a belt buckle mechanism in a design position according to an exemplary embodiment.

Referring now to FIG. 8, a portion of a vehicle seat 12 according to an exemplary embodiment is shown, the vehicle seat 12 including a link bracket 26 having a modified profile and a seat belt buckle 25 including belt buckle tab member 42. The link bracket 26 has a substantially squared or angular elbow portion 44 in the form of a contoured lower surface 46 as opposed to the generally uniformly arcuate or curved elbow portion of the known link bracket 26 as shown in FIG. 7. The seat belt mechanism 24 of the exemplary embodiment includes a belt buckle 25 having a belt buckle tab member 42 (extension or tab) and a belt buckle cover 48. The belt buckle tab member 42 is generally an extension member (or protrusion) that extends laterally outward from the side of the belt buckle 25 and/or the belt buckle cover 48. The belt buckle tab 42 interacts with (contacts or engages) the link bracket 26 to prevent the upper end of the belt buckle 34 from contacting the seat back 14 when the vehicle seat 12 is positioned into the stow position.

Figure 9:
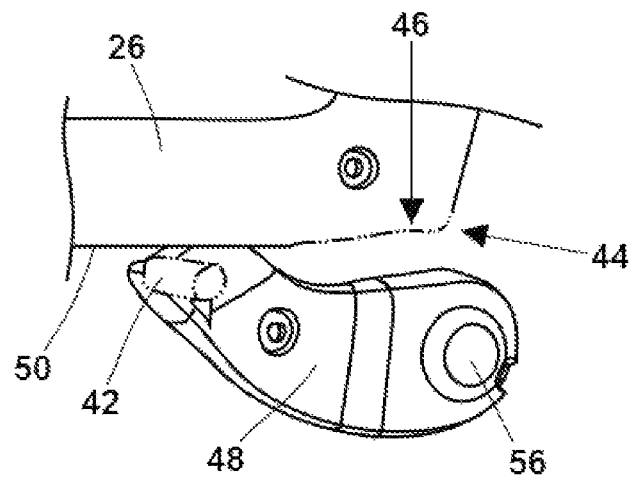
FIG. 9 is a partial perspective view of a belt buckle cover and a link bracket according to an exemplary embodiment.
Figure 10:
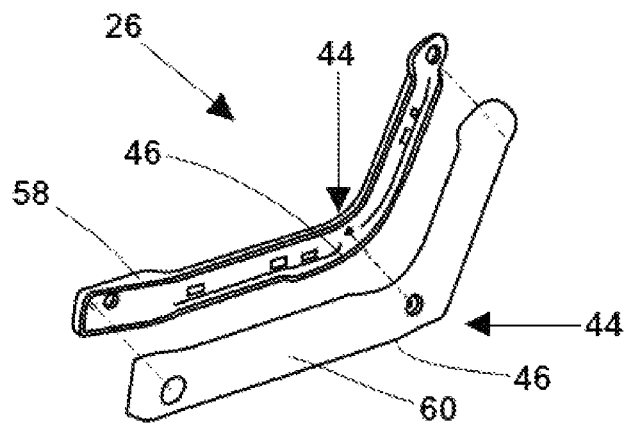
FIG. 10 is an exploded perspective view of a link bracket according to an exemplary embodiment.
Figure 11:
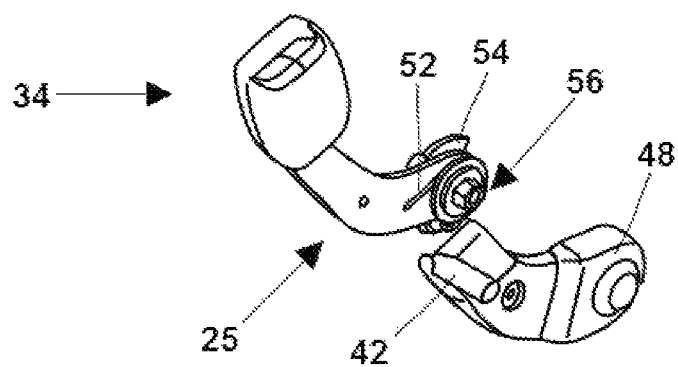
FIG. 11 is an exploded perspective view of a belt buckle according to an exemplary embodiment.
Figure 12:
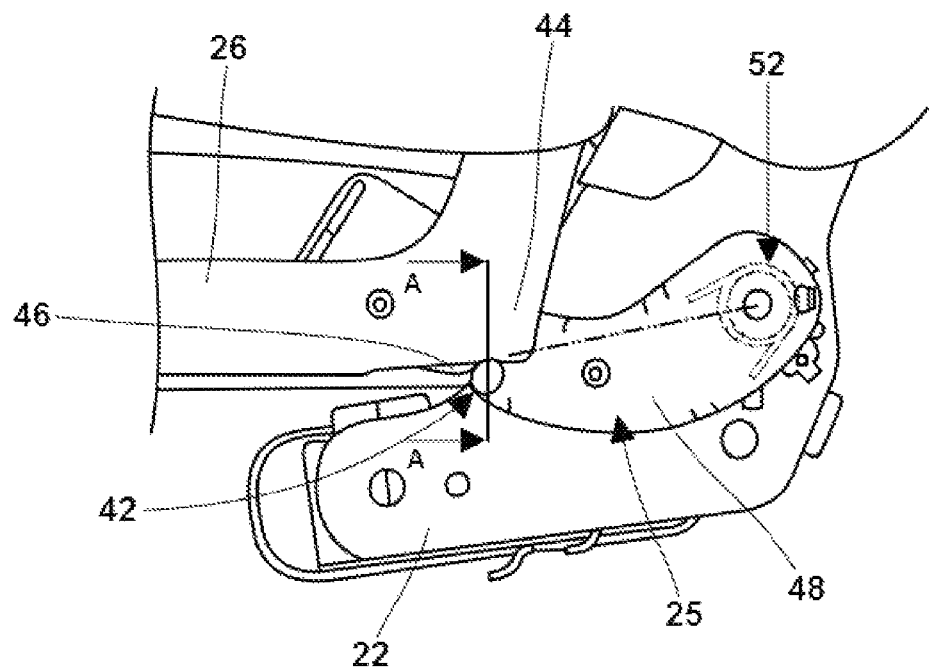
FIG. 12 is a partial side view of a belt buckle and a link bracket according to an exemplary embodiment.
Figure 13:
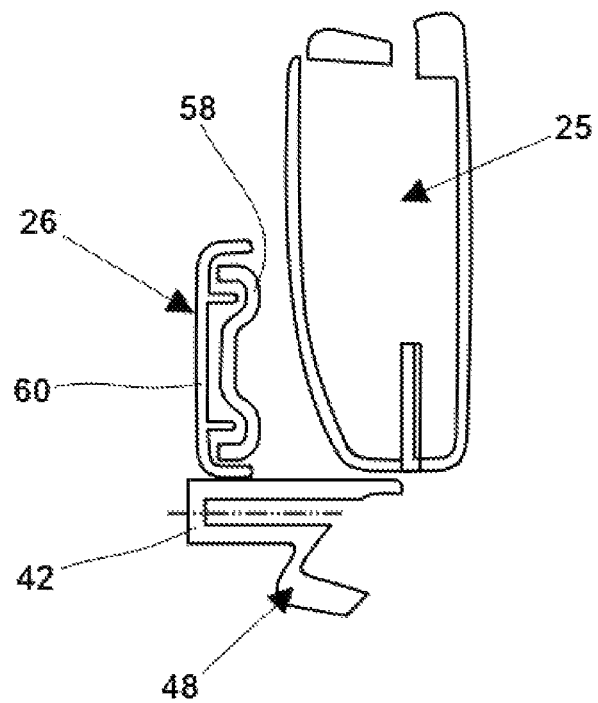
FIG. 13 is a partial, cross-sectional view the belt buckle of FIG. 12 along the A-A line according to an exemplary embodiment.

Referring generally now to FIGS. 9-13, the components of the seat belt mechanism 24 according to an exemplary embodiment are shown. In particular, FIG. 9 shows the link bracket 26 having a generally squared or angular elbow portion 44 having a contoured profile 46 and the belt cover 48 having a belt buckle tab member 42. The belt buckle tab 42 is positioned against the underside surface of the link bracket 50 and is thereby prevented from being displaced upwardly, despite be biased upward, when the vehicle seat 12 is in the design position. When the vehicle seat 12 is in the stow flat position, as shown in FIG. 12, the contoured profile of the underside of the link bracket 46 limits and guides the belt buckle 25 via the contact by the belt buckle tab 42, and the biasing force of the spring 52 located in the other end of the belt buckle 54. Thus the belt buckle 25 is constrained from rotating upward by the action of the spring 52 on the pivot point 56 thereby the upper portion of the belt buckle 34 is prevented from contacting and/or pushing into the seat back trim cover 38. As shown in FIG. 10, the link bracket 26 is comprised of a first and second link bracket member 58, 60 that are generally "L" (hockey stick) shaped and each has a generally squared or angular elbow portion 44 having a portion of the contoured surface 46. As shown in FIG. 11, the seat belt buckle mechanism 24 includes a belt buckle 25 having an upper portion 34 that interlockably receives the connector end of the seat belt 62 (not shown), a biasing force mechanism 52 (e.g., spring, etc.) (35N at the contact point with link bracket) that forces the belt buckle 25 to rotate toward a first position associated with the design position of the vehicle seat 12 wherein the belt buck 25 is upward and (rotates in a clockwise direction as seen in FIG. 11) on the pivot axis 56 (or pivot point which is defined by a bolt or rod or other similar structure) toward the seat back 14, and the belt cover 48 having a belt buckle tab 42.

Figure 14A:
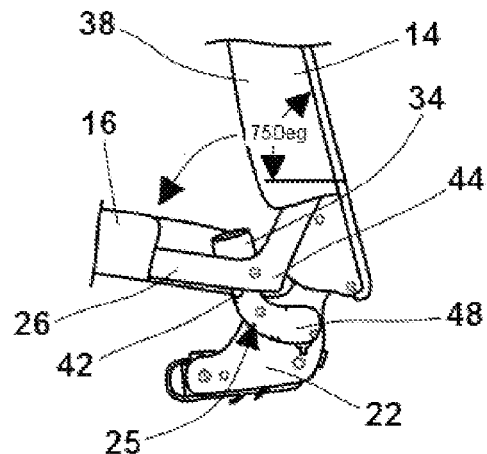
FIG. 14A is a partial side view of a vehicle seat having a belt buckle in a first partially folded position according to an exemplary embodiment.
Figure 14B:
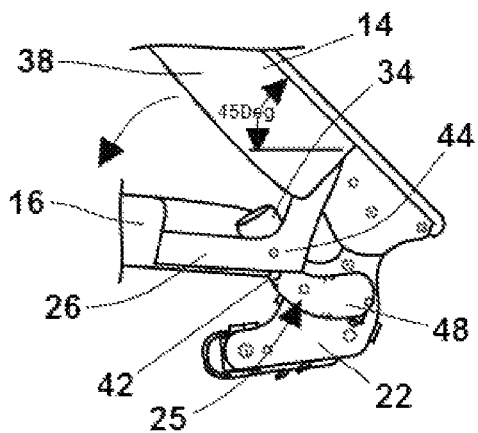
FIG. 14B is a partial side view of a vehicle seat having a belt buckle in a second partially folded position according to an exemplary embodiment.
Figure 14C:
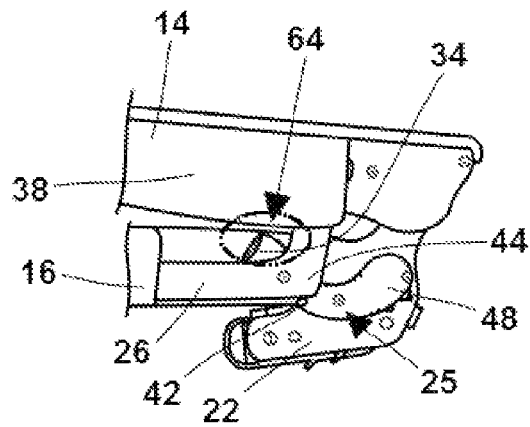
FIG. 14C is a partial side view of a vehicle seat having a belt buckle in a third partially folded (i.e., the stow) position according to an exemplary embodiment.

Referring to FIGS. 14A-14C, there is shown a progression of views of the vehicle seat 12 in different positions between the design position and the stow position. The link bracket 26 and seat belt buckle cover 48 are according to the exemplary embodiment of FIGS. 8-13 and the link bracket 26 limits the position of the belt buckle 25 down to avoid contact between the upper end of the belt buckle 34 and the seat back trim cover 38 and to maintain a gap 64 between the belt buckle 25 and seat hack 14 at all times, as shown in FIG. 14C. This prevents the creation of marks 40, such as wrinkles, and premature wear and tear (i.e., damage) of the trim cover 38 by the belt buckle 25 when the vehicle seat 12 is in the stow position particularly for an extended duration.

Figure 15:
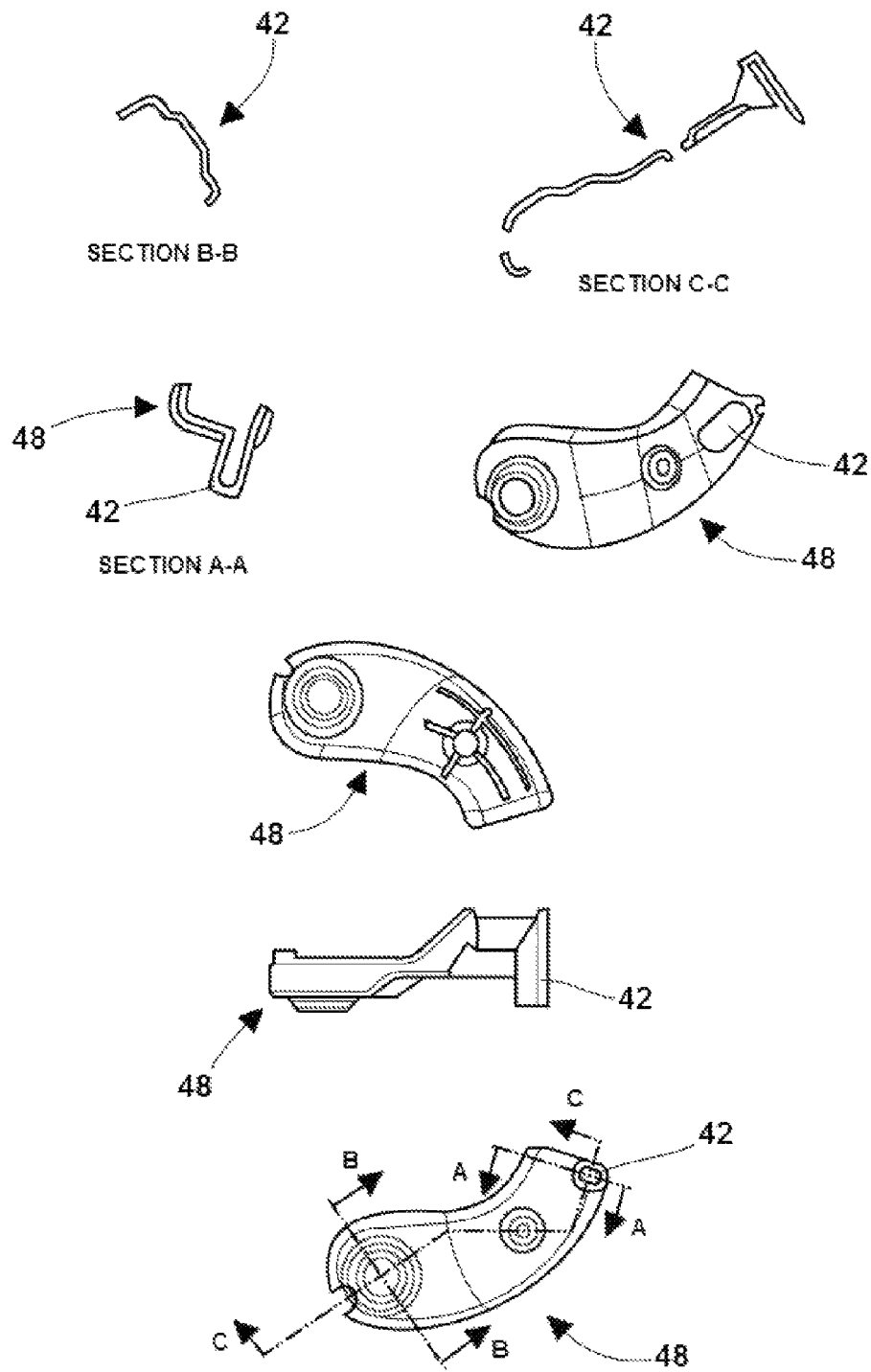
FIG. 15 is a plurality of views of a belt buckle cover according to an exemplary embodiment.
Figure 16:
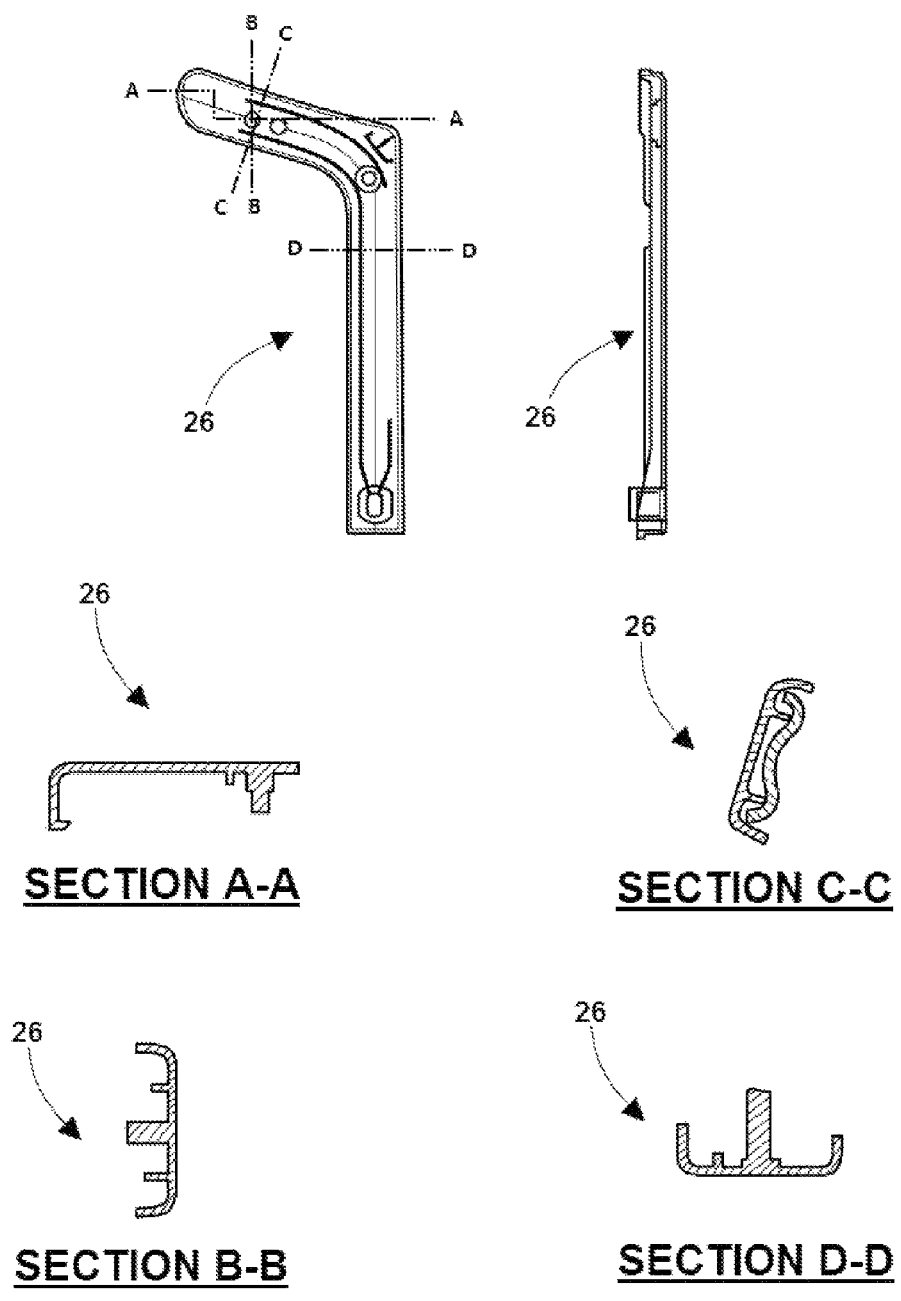
FIG. 16 is a plurality of views of a link bracket according to an exemplary embodiment.
Figure 17A:
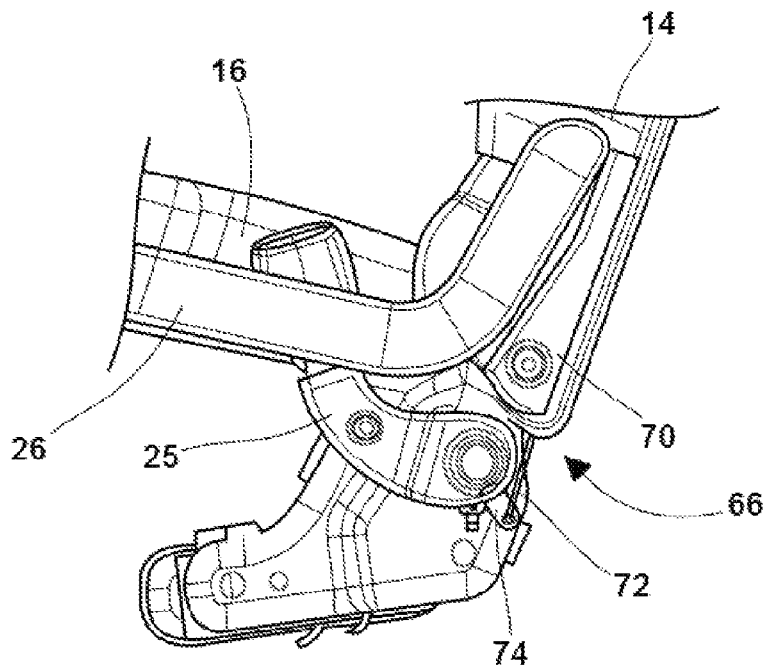
FIGS. 17A-17D are a plurality of views of a seat and seat belt buckle mechanism having a cable system and graph according to an alternate exemplary embodiment.
Figure 17B:
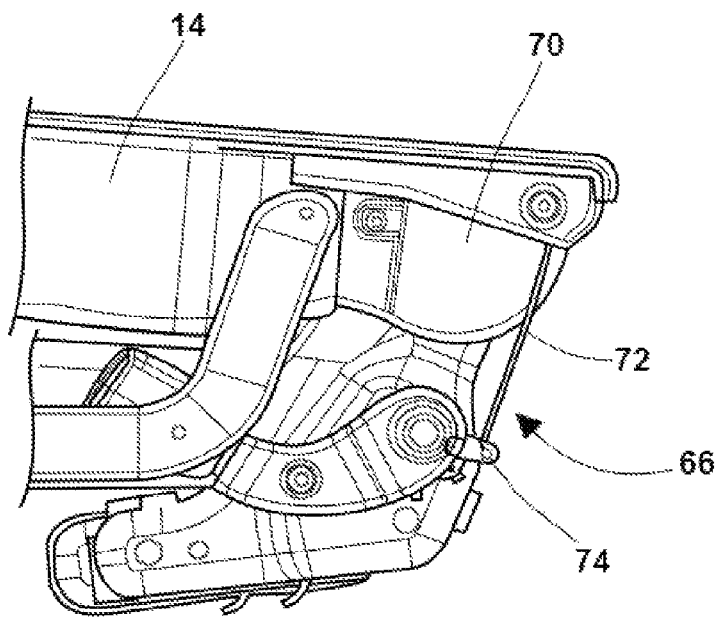
Figure 17C:
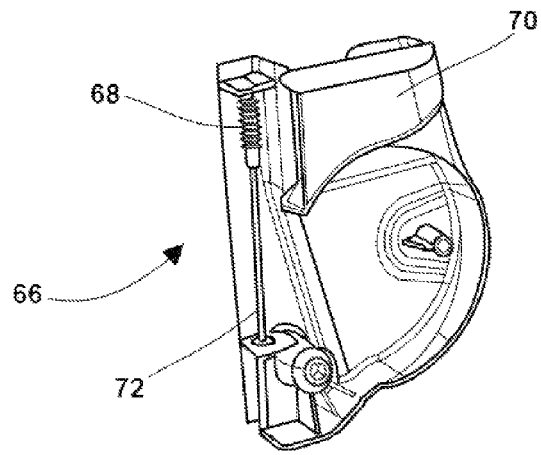
Figure 17D:
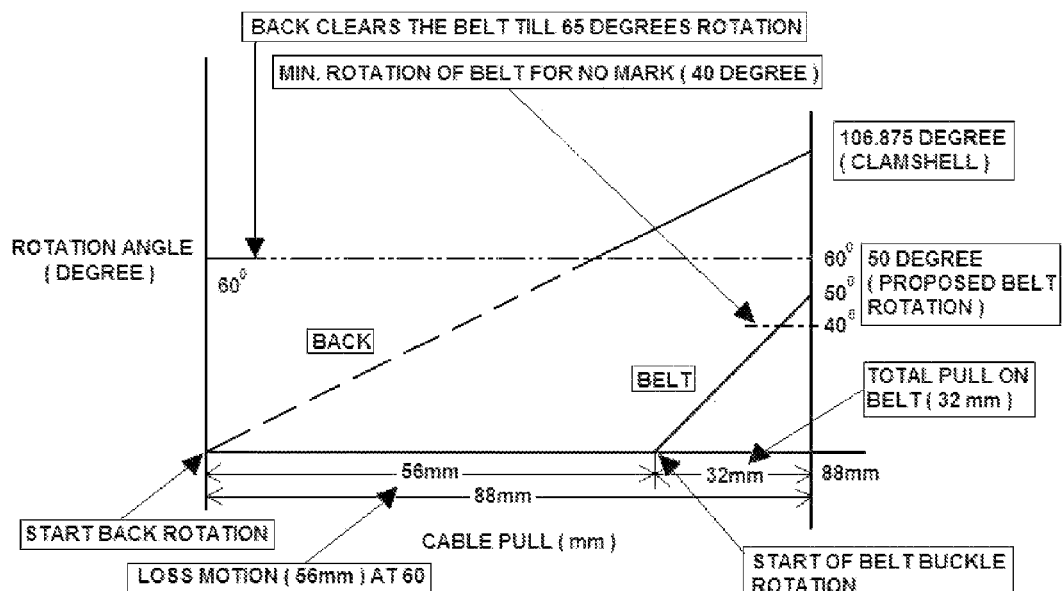

Referring now to FIGS. 15 and 16, various views disclosing the details of the belt buckle cover 48 and link bracket 26 are shown.

Referring now to FIGS. 17-20, alternate exemplary embodiments of the disclosed innovation are shown. FIG. 17A-17C show a plurality of views Showing the seat belt buckle mechanism 24 of an alternate exemplary embodiment having a cable system 66 for limiting upward movement of the seat belt buckle 25. This creates a gap or clearance 64 between the belt buckle 25 and the seat back 14 having a predetermined length (e.g., 15 mm of clearance, etc.). The cable system 66 includes a spring compensator 68 and is mounted directly on the back of the recliner cover 70, as shown in FIG. 17C. The cable 72 is coupled at one end to the recliner cover 70 (spring compensator 68) and coupled at its second end to the belt buckle 25 via an attachment member 74. The cable system 66 retracts the belt buckle 25 between the design position (FIG. 17A) and the stow position (FIG. 17B). FIG. 17D is a graph depicting seat back 14 rotation versus cable 72 pull versus belt buckle 25 rotation in terms of rotation angle and cable pull distance.

Figure 18A:
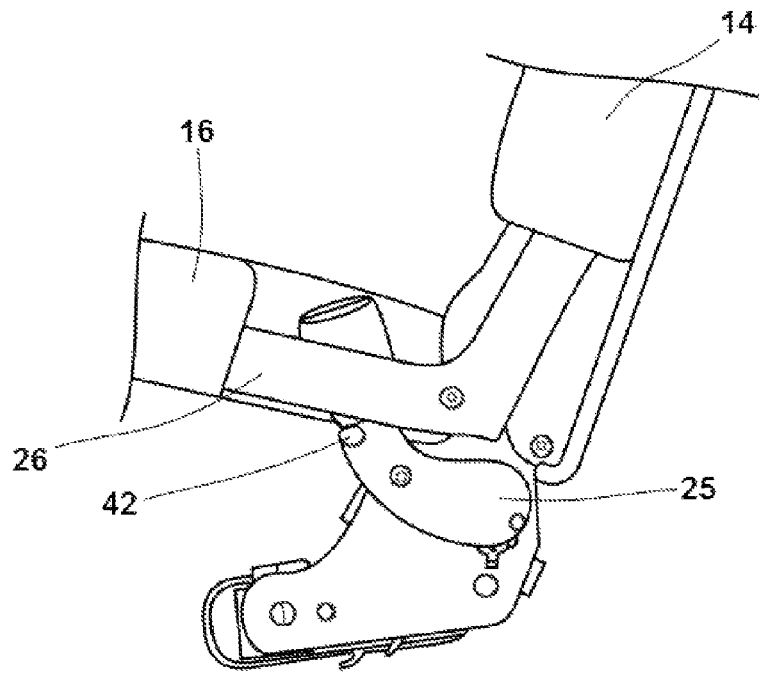
FIGS. 18A-18D are a plurality of views of a seat belt buckle mechanism having a tab system and a graph according to an alternate exemplary embodiment.
Figure 18B:
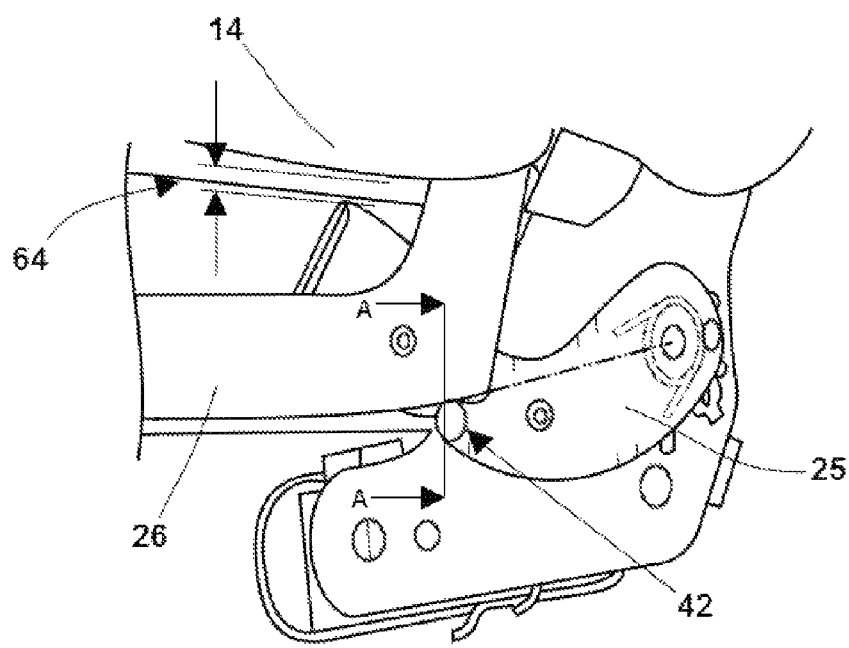
Figure 18D:
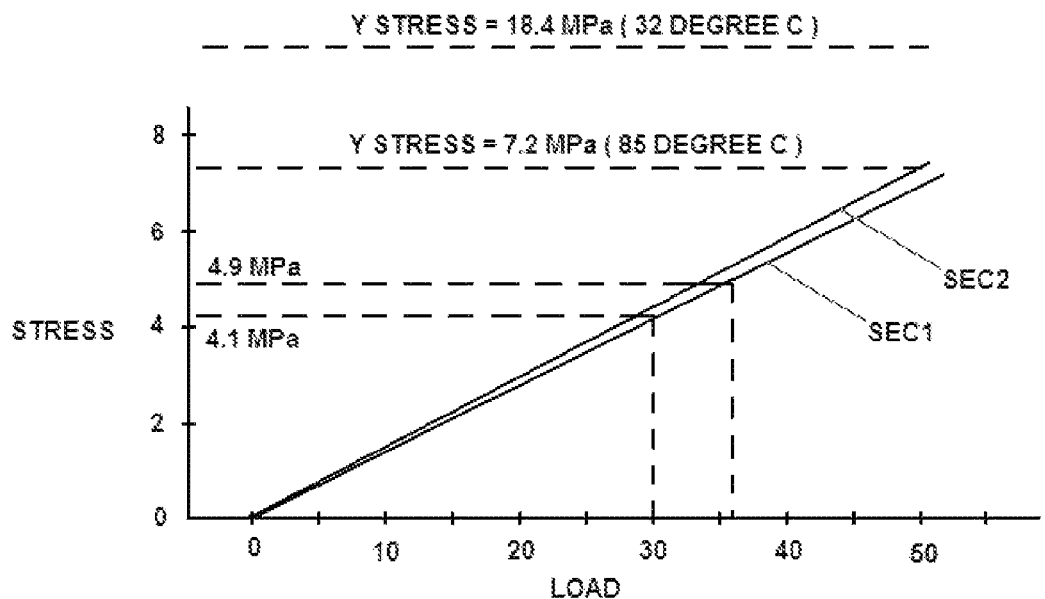
Figure 18C:
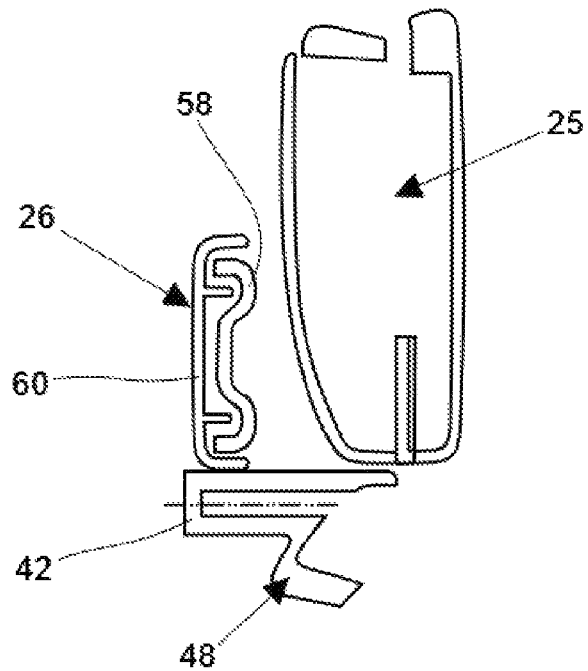

FIGS. 18A-18D shows a plurality of views showing the seat belt buckle mechanism 24 of an alternate exemplary embodiment having a tab member 42 for limiting upward movement of the seat belt buckle 25 similar to FIGS. 8-13. The link bracket 26 limits the upward movement of belt buckle 25 due to contact of the tab member 42 with the link bracket 26 as the vehicle seat 12 is moved from the design position (FIG. 18A) to the stow position (FIG. 18B). This creates a gap or clearance 64 between the belt buckle 25 and the seat back 14 having a predetermined length (e.g., 10 mm of clearance, etc.). FIG. 18D is a graph depicting the load versus stress on the belt buckle 25.

Figure 19A:
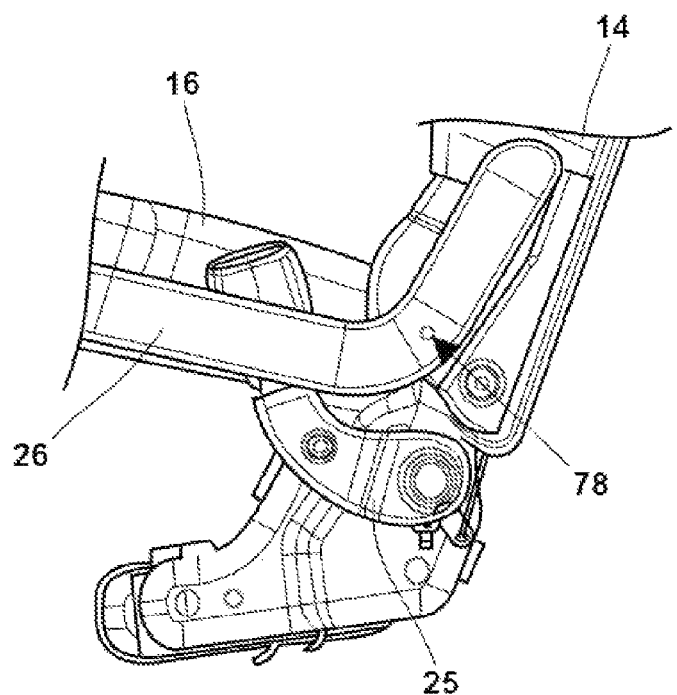
FIGS. 19A and 19B are a plurality of views of a seat belt buckle mechanism having a link (or pin) system according to an alternate exemplary embodiment.
Figure 19B:
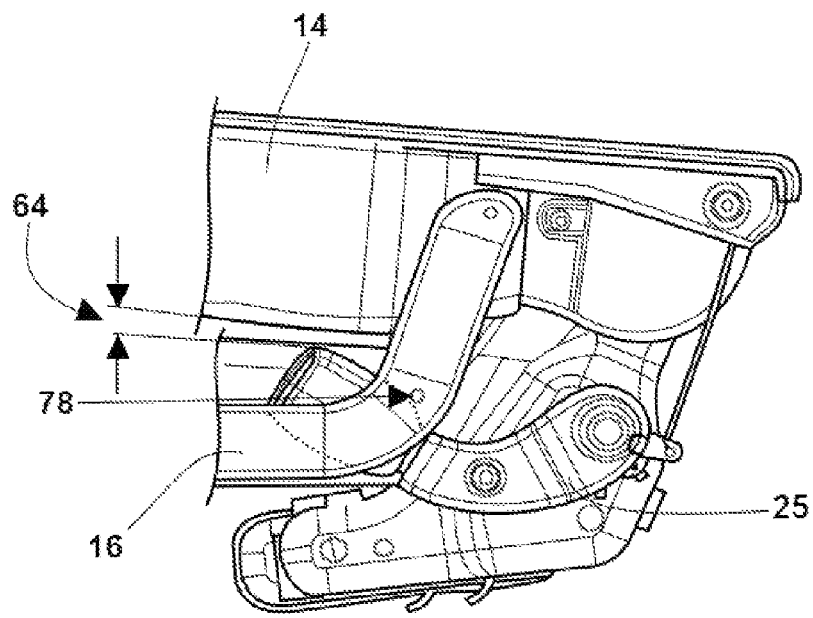

FIGS. 19A-19B show a plurality of views showing the seat belt buckle mechanism 24 of an alternate exemplary embodiment having a pin system 76. The pin 78 is riveted to the link bracket 26 and limits the upward movement of belt buckle 25 due to contact of the pin 78 with link bracket 26 as the seat back 14 rotates from the design position (FIG. 19A) to the stow (clamshell) position (FIG. 19B). This creates a gap or clearance 64 between the belt buckle 25 and the seat back 14 having a predetermined length (e.g., 10 mm of clearance, etc.).

Figure 20A:
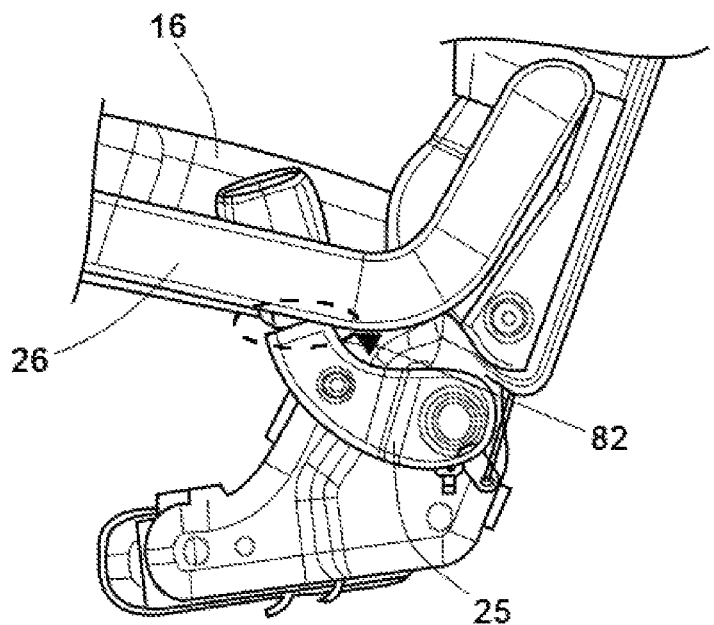
FIGS. 20A and 20B are a plurality of views of a seat belt buckle mechanism having an elastic strap system according to an alternate exemplary embodiment.
Figure 20B:
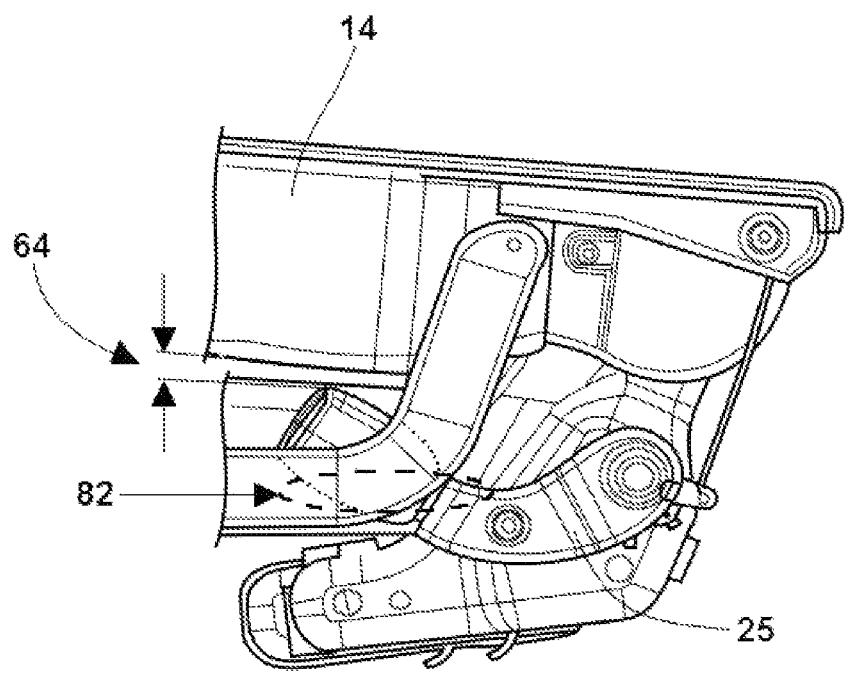

FIGS. 20A-20B show a plurality of views showing the seat belt buckle system 24 of an alternate exemplary embodiment having an elastic strap system 80. The elastic strap 80 system includes an elastic strap 82 that is coupled (e.g., sewn, etc.) at one end to the seat cushion 16 and coupled (e.g., wrapped around, etc.) at its send end to the belt buckle 25. The elastic strap 82 connects the belt buckle 25 to the seat base 16 (i.e., cushion) and limits the upward movement of belt buckle 25 due to the strap 82 restraining the belt buckle 25 down as the seat back 14 rotates from the design position (FIG. 20A) to the stow flat (clamshell) position (FIG. 20B). This creates a gap or clearance 64 between the belt buckle 25 and the seat back 14 having a predetermined length (e.g., 10 mm of clearance, etc.).

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and an additional member being attached to one another. Such joining may be permanent in nature or alternatively may be removable or releasable in nature.

It is also important to note that the construction and arrangement of the elements of the vehicle seat as shown in the preferred and other exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present innovations. Other substitutions, modifications, changes and omissions may be made in the design, operating conditions and arrangement of the preferred and other exemplary embodiments without departing from the spirit of the present innovations.

What is claimed is:

1. A seat buckle apparatus for use in a vehicle seat assembly having a seat back, a seat base, and a base portion, the seat buckle apparatus comprising:
   a bracket member having a first end and a second end, wherein the bracket member couples the seat back to the seat base;
   a first belt buckle portion movably supported on the vehicle seat and having an upper end, a lower end, and an engagement member extending from the upper end of the first belt buckle portion for engaging an underside of the bracket member, wherein the bracket member prevents the upper end of the belt buckle from contacting the seat back when the seat back is folded down on the seat base.

2. The seat buckle apparatus of claim 1, wherein the first end of the bracket member is pivotably coupled to the seat back and the second end of the bracket member is coupled to the seat base.

3. The seat buckle apparatus of claim 1, wherein the lower end of the belt buckle is pivotably coupled to the base portion such that the engagement member of the belt buckle portion is positioned against a first surface of the bracket member.

4. The seat buckle apparatus of claim 1, wherein the bracket member includes an elbow portion that engages the engagement member of the belt buckle portion and forces the belt buckle portion downward when the seat back is moved from a first position to a second position to prevent the belt buckle portion from contacting the seat back.

5. The seat buckle apparatus of claim 4, wherein the first position is a design position and the second position is a stow position.

6. The seat buckle apparatus of claim 1, wherein the lower end of the belt buckle portion includes a biasing member for biasing the belt buckle in the upward direction.

7. The seat buckle apparatus of claim 1 wherein a clearance gap between the upper end of the belt buckle portion and the seat back is maintained when the seat back is moved to the stow position.

8. A vehicle seat assembly, comprising:
   a seat back pivotably coupled to a seat base by a bracket member having a first end and a second end;
   a seat buckle apparatus; a first belt buckle portion movably supported on the vehicle seat and having an upper end, a lower end, and an engagement member extending from the upper end of the first belt buckle portion for engaging an underside of the bracket member wherein the bracket member prevents the upper end of the belt buckle from contacting the seat back when the seat back is folded down on the seat base.

9. The vehicle seat assembly of claim 8, wherein the first end of the bracket member is pivotably coupled to the seat back and the second end of the bracket member is for being coupled to the seat base.

10. The vehicle seat assembly of claim 8, wherein the lower end of the belt buckle portion is pivotably coupled to a base portion such that the engagement member of the belt buckle portion is positioned against a first surface of the bracket member.

11. The vehicle seat assembly of claim 8, wherein the bracket member includes an elbow portion for engaging the engagement member of the belt buckle portion that forces the belt buckle portion downward when the seat back is moved from a first position to a second position thereby preventing the belt buckle portion from contacting the seat back.

12. The vehicle seat assembly of claim 8, wherein the lower end of the belt buckle portion includes a biasing member for biasing the belt buckle in the upward direction.

13. The vehicle seat assembly of claim 8 wherein the vehicle seat includes a gap clearance between the upper end of the belt buckle portion and the seat back that is maintained when the seat back is moved to a second stow position.

\* \* \* \* \*